United States Patent
Wei et al.

(10) Patent No.: US 8,674,532 B2
(45) Date of Patent: Mar. 18, 2014

(54) HYBRID CONCENTRATED SOLAR COMBINED CYCLE POWER PLANT AND SOLAR REFORMER FOR USE THEREIN

(75) Inventors: Wei Wei, Tustin, CA (US); Lingzhi Zhang, Mission Viejo, CA (US); Parag Prakash Kulkarni, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 496 days.

(21) Appl. No.: 13/096,418

(22) Filed: Apr. 28, 2011

(65) Prior Publication Data

US 2012/0274078 A1 Nov. 1, 2012

(51) Int. Cl.
*B60K 16/00* (2006.01)
*F03G 6/00* (2006.01)

(52) U.S. Cl.
USPC .............................................. 290/2; 60/641.8

(58) Field of Classification Search
USPC .......................... 290/1 A, 2; 60/641.8, 641.12
See application file for complete search history.

(56) References Cited

U.S. PATENT DOCUMENTS

| | | | |
|---|---|---|---|
| 5,444,972 A | 8/1995 | Moore | |
| 6,233,914 B1 | 5/2001 | Fisher | |
| 6,321,539 B1 * | 11/2001 | Bronicki et al. | 60/641.8 |
| 6,832,485 B2 * | 12/2004 | Sugarmen et al. | 60/780 |
| 6,910,335 B2 * | 6/2005 | Viteri et al. | 60/786 |
| 7,331,178 B2 | 2/2008 | Goldman | |
| 7,954,321 B2 * | 6/2011 | Shinnar | 60/641.8 |
| 2003/0097843 A1 * | 5/2003 | Sugarmen et al. | 60/780 |
| 2006/0174622 A1 | 8/2006 | Skowronski | |
| 2008/0127647 A1 | 6/2008 | Leitner | |
| 2010/0176602 A1 * | 7/2010 | Shinnar | 290/1 A |
| 2011/0272003 A1 * | 11/2011 | Elazari | 136/248 |
| 2011/0277471 A1 * | 11/2011 | Shinnar | 60/641.14 |

FOREIGN PATENT DOCUMENTS

GB 2449181 A 12/2008

* cited by examiner

*Primary Examiner* — Nicholas Ponomarenko
(74) *Attorney, Agent, or Firm* — Francis T. Coppa

(57) ABSTRACT

A hybrid concentrated solar combined cycle (CSCC) power plant based on solar reforming technology, method of generating electricity using the system and a solar reformer for use in the system are provided. The system enables integration of a concentrated solar power plant (CSP) and a combined cycle gas turbine (CCGT) power plant, resulting in a hybrid system that corrects known issues related to large-scale concentrated solar power generation. The solar reformer provides for the storage of solar energy in a reformate fuel during the reforming reaction and subsequent release through a gas turbine combustion reaction. Fuels directed into the gas turbine power plant can be alternated between hydrocarbon fluid and the reformate fuel dependent upon available solar thermal energy.

20 Claims, 6 Drawing Sheets

HYBRID CONCENTRATED SOLAR COMBINED CYCLE POWER PLANT AND SOLAR REFORMER FOR USE THEREIN

BACKGROUND

The invention relates generally to power generation systems, and more particularly to hybrid solar power generation systems.

Concentrated solar power (CSP) is currently considered the most economic and efficient way of generating electricity from solar energy at large scale. However, there are still significant challenges, beside the high capital cost of solar collection system, that limit the wide adoption of CSP technology for large-scale power generation. One such challenge with the current generation of solar power plants is the low production capacity factor due to the intermittent nature of solar energy. This intermittent nature of solar energy results in the CSP plants costly steam turbine cycle systems being idle as much as 75% of the time. The low utilization of the power island results in a very low return on investment (ROI) of the power system and, therefore, negatively impacts the economics of the CSP plant.

Another challenge with current generation of solar power plants is that the addition of large amounts of renewable power into the grid often necessitates the addition of natural gas based backup or reserve capacity in order to offset the intermittent nature of renewable energy and provide stability to the grid. From the perspective of grid operators and consumers, this redundancy in capacity is another hidden source of high cost of electricity as a result of adding more renewable power to the grid. Such reserve power plants typically operate at low capacity factors and use only simple cycle gas turbines that have lower efficiency and, therefore, emit more $CO_2$ per MWh than combined cycle gas turbine (CCGT) plants. To circumvent the low capacity factor of the concentrated solar power, molten salt based thermal storage technologies have been proposed and demonstrated at small scale; however, these systems require additional technology development prior to use on a large scale to overcome the high initial capital costs and the low thermal efficiencies due to the use of indirect heat transfer and steam turbine cycles.

With respect to the solar reformer, designs for small-scale solar reforming, which is aimed at hydrogen production via ultra high temperature steam methane reforming has been attempted. Although possibly acceptable for small scale applications, this design is not suitable for power generation scenarios due to the high cost of solar thermal heating systems and high consumption of water.

It would therefore be desirable to provide an improved hybrid solar power generation system that corrects the above issues related to large-scale concentrated solar power generation.

BRIEF DESCRIPTION

Briefly, one aspect of the present invention resides in an electric power generation system including a concentrated solar plant (CSP) comprising a solar field and a steam generator, a solar reformer, and a combined cycle gas turbine (CCGT) power plant for generating electricity. The solar reformer is configured to receive solar energy from the solar field and a hydrocarbon fluid as an incoming reactant stream. The solar reformer converts the solar energy and the incoming reactant stream to thermal energy and chemical energy via a reforming action to form a reformate fuel. The combined cycle gas turbine (CCGT) power plant is configured to receive a hydrocarbon fluid and the reformate fuel from the solar reformer and emit combustion exhaust gas. The combined cycle gas turbine power plant is configured operable based on at least one of the hydrocarbon fluid and the reformate fuel in response to the availability of solar energy to the solar reformer. The steam generator is configured to receive the hot exhaust gas emitted from the combined cycle gas turbine power plant to generate electricity.

Another aspect of the invention resides in a method of generating electric power including controlling a flow of a hydrocarbon fluid between a combustion chamber of a combined cycle gas turbine power plant and a solar reformer, reforming the hydrocarbon fluid in the solar reformer by converting the solar energy and the hydrocarbon fluid to thermal energy and chemical energy via a reforming action to form a reformate fuel, supplying the reformate fuel to a combined cycle power plant and supplying the hot exhaust gas to a steam generator. The solar reformer is configured to receive solar energy from a solar field and the hydrocarbon fluid. The combined cycle gas turbine power plant is configured to receive one of the hydrocarbon fluid and the reformate fuel from the solar reformer and emit hot exhaust gas. The steam generator is configured to receive the hot exhaust gas emitted from the combined cycle gas turbine power plant and generate electricity. The combined cycle gas turbine power plant is configured operable based on at least one of the hydrocarbon fluid and the reformate fuel, in response to the availability of solar energy to the solar reformer.

Still another aspect of the invention resides in a solar reformer configured to receive solar energy from the solar field and a hydrocarbon fluid as an incoming reactant stream, wherein the solar reformer converts the solar energy and the incoming reactant stream to thermal energy and chemical energy via a reforming action to form a reformate fuel. The solar reformer includes a cone shaped opening configured to concentrate the received solar energy through a quartz window and into a reforming chamber, a reforming catalyst disposed therein the reforming chamber, and a coaxial tube-in-tube pipe in fluidic communication with the reaction chamber that is configured to provide an inlet for the incoming reactant stream and an outlet for the reformate fuel. The solar reformer is operational to power a combined cycle gas turbine power plant in the presence of solar energy.

These and other features and improvements of the present application will become apparent to one of ordinary skill in the art upon review of the following detailed description when taken in conjunction with the several drawings and the appended claims.

DRAWINGS

The above and other features, aspects, and advantages of the present invention will become better understood when the following detailed description is read with reference to the accompanying drawings in which like characters represent like parts throughout the drawings, wherein.

Figure 3:
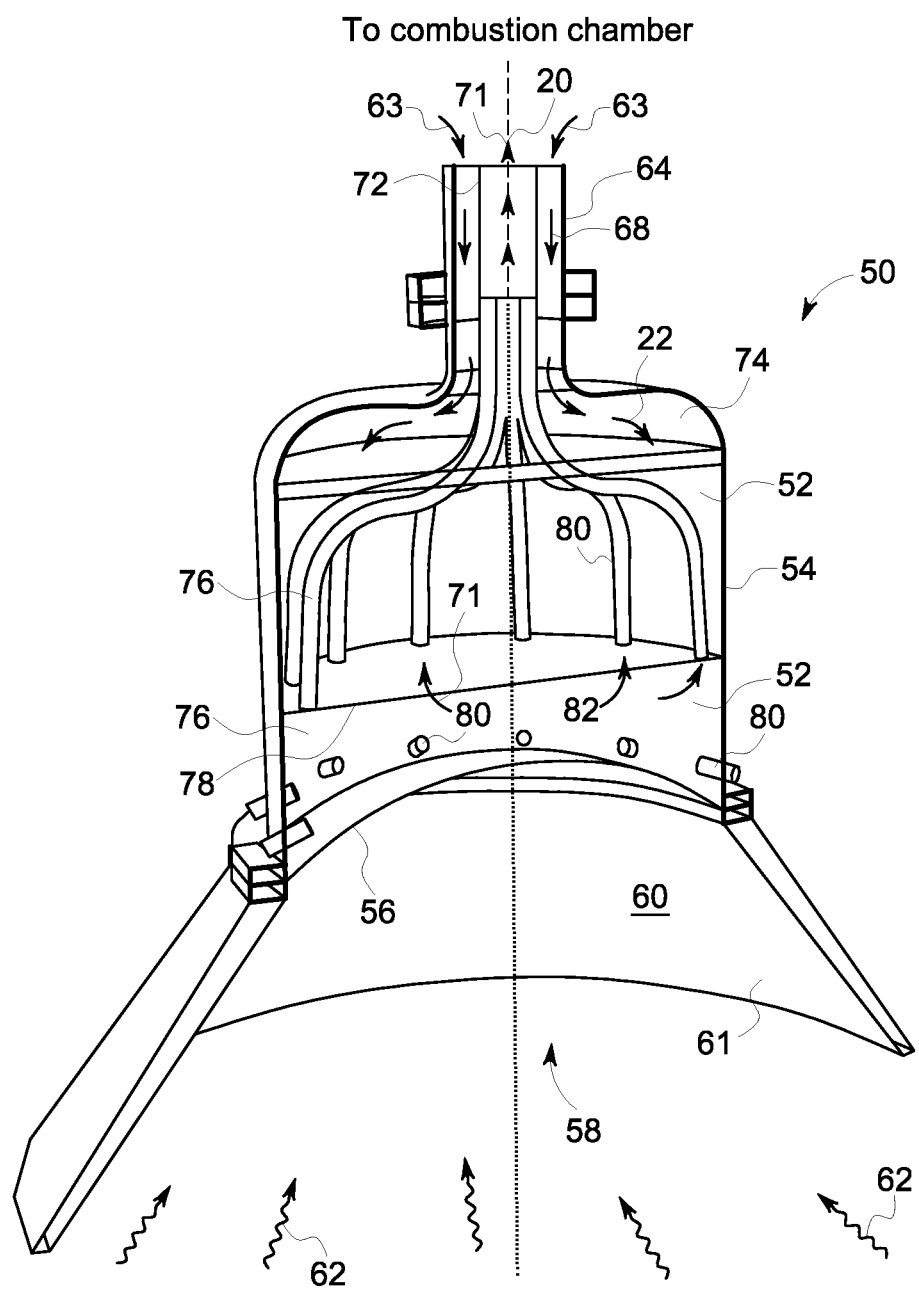
Figure 4:
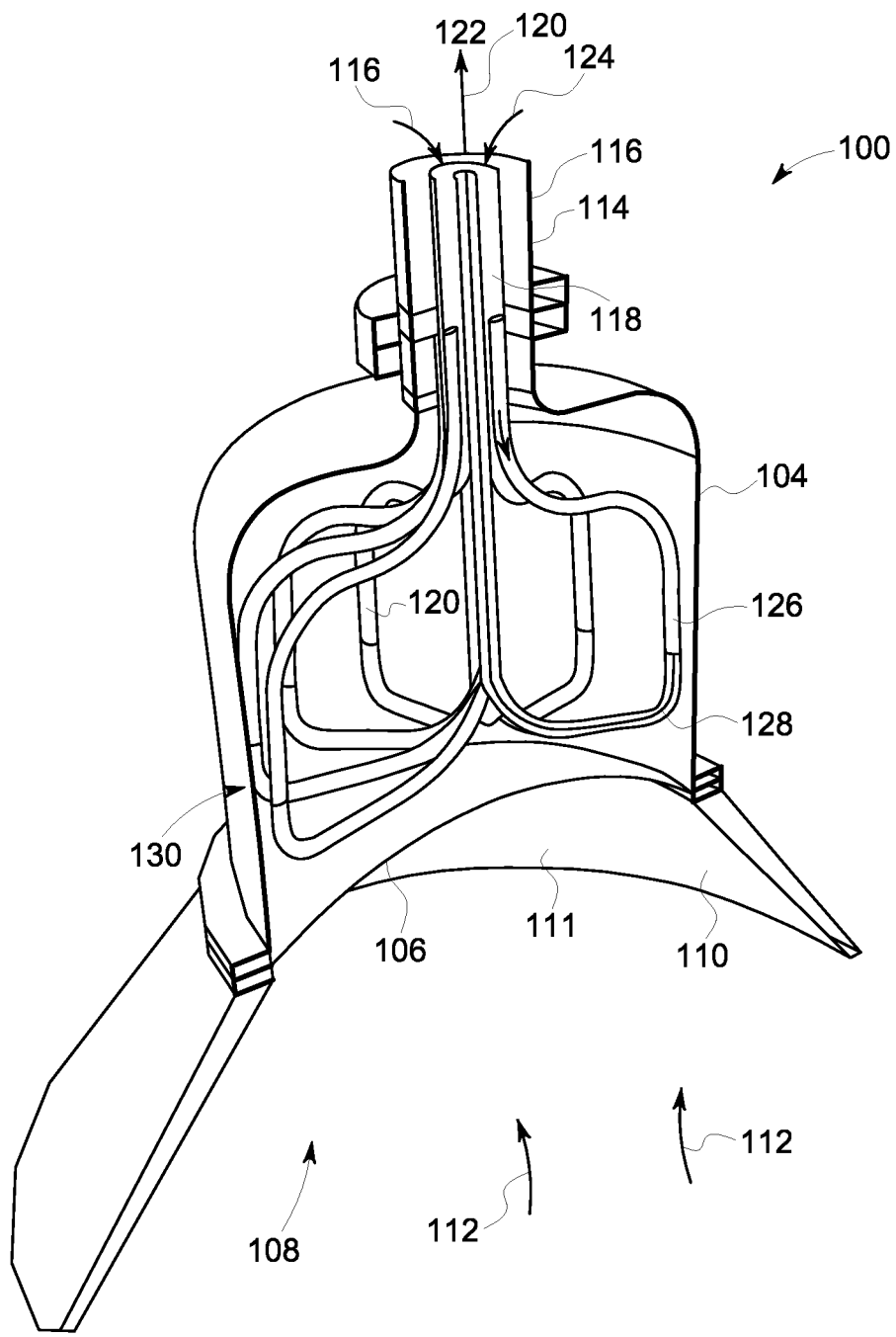
Figure 5:
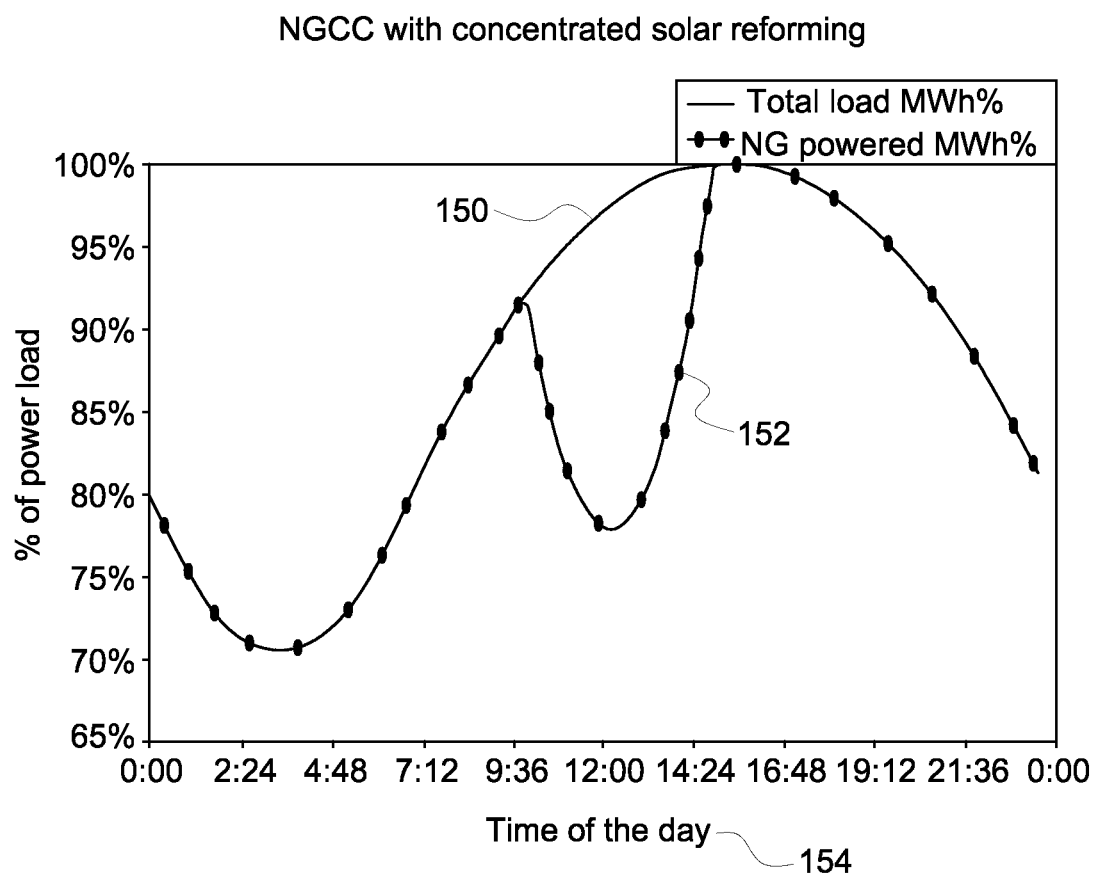
Figure 6:
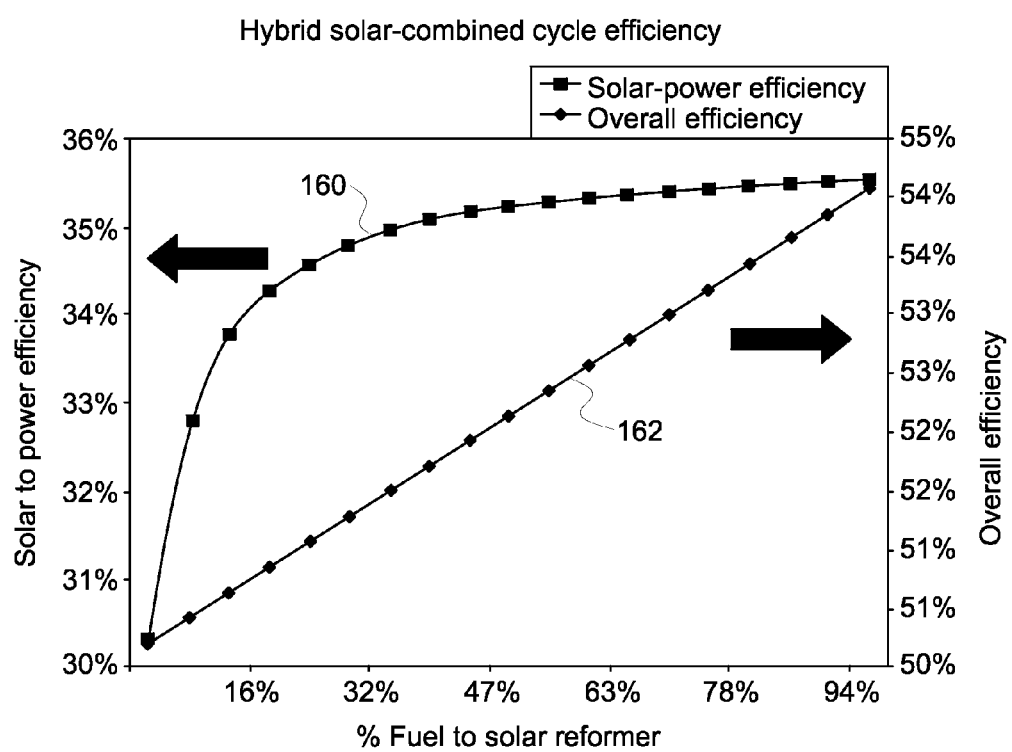

FIG. 3 schematically depicts in isometric view a solar reformer for use in a hybrid concentrated solar combined cycle power plant according to another embodiment;

FIG. 4 schematically depicts in isometric view a solar reformer for use in a hybrid concentrated solar combined cycle power plant according to another embodiment;

FIG. 5 illustrates in a graphical view, the solar powered portion of a total load on a power generation system during a typical day according to an embodiment; and FIG. 6 illustrates in a graphical view, the hybrid solar-combined cycle efficiency as it relates to overall power efficiency according to an embodiment.

DETAILED DESCRIPTION

As discussed in detail below, embodiments of the present invention function to provide an efficient means for the generation of electricity in a power generation plant that utilizes solar energy and natural gas. Disclosed is a hybrid concentrated solar combined cycle power plant concept based on solar reforming technology that would enable the integration of a concentrated solar power plant and a natural gas combined cycle plant, resulting in a hybrid system that corrects known issues related to large-scale concentrated solar power generation. Solar energy can be stored in the reformate fuel during the reforming reaction and released through gas turbine combustion reaction. Fuels directed into the combined cycle gas turbine power plant can be alternated between natural gas and the reformate fuel dependent upon available solar thermal energy. When solar thermal energy is plentiful, the system would be operable based on the flow of the reformate fuel directed into the combined cycle gas turbine power plant. When solar thermal energy was not available, the system would be operable based on a standard flow of fuel directly into the combined cycle gas turbine power plant. This dual mode of operation provides for a stable and desirable power output, reduced fossil fuel consumption, reduced $CO_2$ emission and results in higher overall efficiency of the power generating plant.

Figure 1:
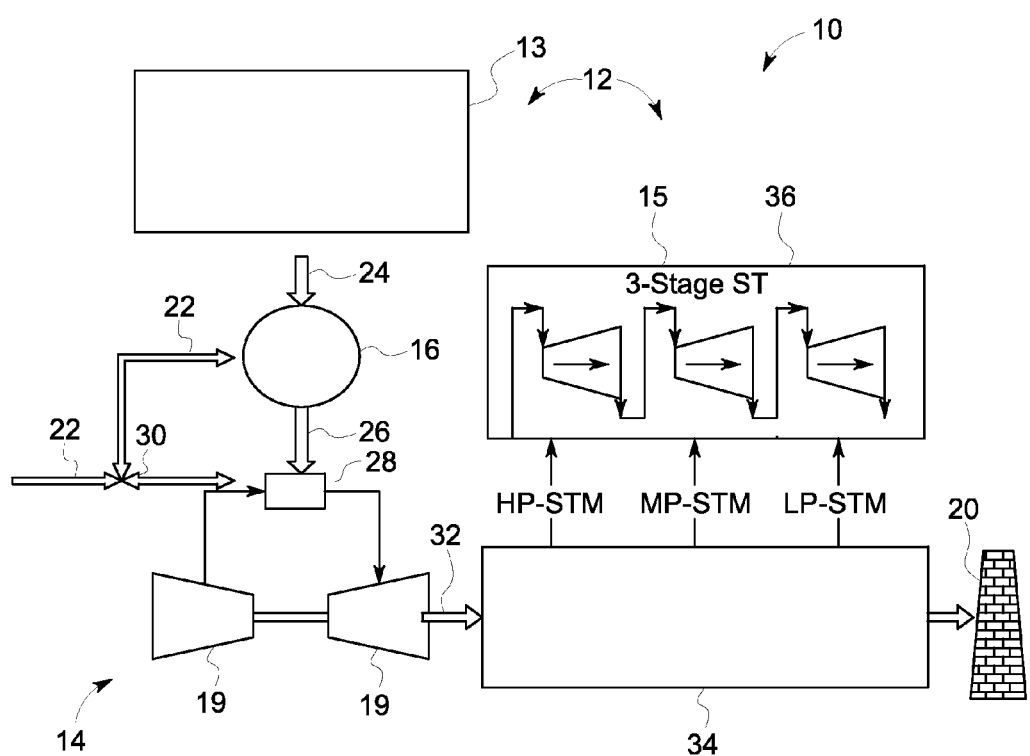
FIG. 1 is a schematic diagram of a hybrid concentrated solar combined cycle power plant according to an embodiment.

Turning now to the figures, illustrated in FIG. 1 is a preferred embodiment of a hybrid concentrated solar combined cycle (CSCC) power system according to the disclosure for producing mechanical and/or electrical power. More specifically, illustrated is a hybrid concentrated solar combined cycle system, generally referenced 10, comprised of a solar field 13 and steam generator 15 from a CSP plant 12 and a combined cycle gas turbine power plant 14. The critical technology that links the two power plant systems 12 and 14 together is a solar reformer 16, wherein solar energy and a hydrocarbon fluid are converted to thermal heat as well as chemical energy to form a reformate fuel via a reforming reaction.

The solar reformer 16 allows solar energy to travel through a highly efficient combined cycle gas turbine power plant, and more particularly a combustion chamber 28 and a plurality of gas turbines 19, of the combined cycle gas turbine power plant 14, which leads to high efficiency conversion of solar energy to power. The combined cycle gas turbine power plant 14 can be easily adjusted between duel fuels, either the reformate fuel or the hydrocarbon fluid, or a mixture of the reformate fuel and hydrocarbon fluid, depending on the availability of sunlight. The net result of this dual fuel system is a high utilization rate of the power island and a stable power output to an exhaust stack 20, eliminating the need for any reserve capacity. It should be understood that while disclosed herein is the use of a hydrocarbon fluid, and more particularly in a preferred embodiment natural gas, alternate hydrocarbon fluids such as methane, biogas, or other suitable materials such as liquid petroleum gas (LPG), etc. are anticipated by this disclosure.

During typical daylight operation of the proposed hybrid CSCC system 10, a hydrocarbon fluid 22, such as natural gas, is routed into the solar reformer 16, where solar thermal energy 24 provided by the CSP plant 12 is concentrated by a mirror system (described presently). The concentrated solar thermal energy 24 generates a high temperature of over 500° C. within the solar reformer 16 and is used to drive a methane-reforming reaction within the solar reformer 16 shown below:

$$CH_4 + H_2O + (Solar\ Heat) \rightarrow CO + 3H_2$$

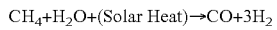

Where a higher natural gas (NG) conversion is required or water consumption is a major limitation, a partial oxidation based solar reform design may be used. In this configuration, the concentrated solar thermal energy 24 generates a high temperature of over 500° C. within the solar reformer 16 where a small amount of air, or oxygen containing gas, is used to partially oxidize a portion of the hydrocarbon fuel, and more particularly the natural gas fuel. It is anticipated that only a small amount of oxygen may be required in light of the solar energy supplement that reduces the need for oxygen in response to availability. The exothermic heat from the partial oxidation reaction will help boost the temperature of the reforming gas to over 800° C. where a high conversion of natural gas can be achieved. The presence of oxygen can also effectively inhibit the formation of coke (described presently) that significantly reduces the need for excess amounts of water in the reforming reaction. In this configuration, the solar thermal energy 24 is used to drive a methane-reforming reaction within the solar reformer 16 shown below:

$$4CH_4 + O_2 + 2H_2O \rightarrow 10H_2 + 4CO$$

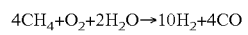

The endothermic reaction within the reformer 16 absorbs the solar thermal energy 24 and converts it into chemical energy in product gases, forming a reformate fuel 26. The reformate fuel 26 is then combusted within the combustion chamber 28 of the combined cycle gas turbine power plant 14, releasing the chemical energy in the original supplied hydrocarbon fluid 22, plus the solar thermal energy 24 absorbed during the reforming reaction. In the hybrid concentrated solar combined cycle power plant 10, the combined cycle gas turbine power plant 14 generates power from exhaust gases 32, and more particularly the heat generated by the combustion of the reformate fuel 26 and air within the combustion chamber 28. The exhaust gases 32 from the combined cycle gas turbine power plant 14, usually at a temperature in excess of 1000° F., are next sent to a heat recovery steam generator (HRSG) 34, where the thermal heat in the exhaust gas 32 is further recovered to raise superheated steam and to generate power in a steam cycle. More specifically, the heat from exhaust gases 32 is reused to generate additional power as a result of the generation of steam that is introduced into a plurality of steam turbines 36.

In another embodiment, exhaust gases 32 from the combined cycle gas turbine power plant 14 containing $CO_2$ and $O_2$ can be recycled back to the reforming chamber of the solar reformer 16 and/or to the combustion chamber 28. In the reformer 16 the recycled exhaust gases 32 may be used for a reforming process where NG reacts with $O_2$ in an exothermic reaction and $CO_2$ reacts with NG via endothermic reaction shown below:

$$CH_4 + CO_2 + (Solar\ Heat) \rightarrow 2CO + 2H_2$$

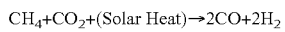

The extent of these reactions will be determined by the relative concentration of $O_2$ and $CO_2$. Formation of CO via the above reaction helps in improving the operability and efficiency of the process. In the combustion chamber 28 the recycled exhaust gases 32 will act as a dilutent that can reduce $NO_x$ and increase concentration of $CO_2$ in the exhaust 32.

In yet another embodiment, a $CO_2$ stream can be separated from the turbine exhaust gases 32 and recycled back to reformer 16. This configuration helps achieve additional steam reduction by promoting a reaction as shown below:

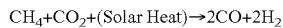

$$CH_4 + CO_2 + (Solar\ Heat) \rightarrow 2CO + 2H_2$$

The use of air injection, turbine exhaust recycle, $CO_2$ recycle or the combination of these three, may help reduce reformer steam consumption, prevent coke formation, enhance solar energy utilization rate, improve gas turbine emission performance and potentially lead to an increased concentration of $CO_2$ in the turbine exhaust gases 32, thus making post combustion carbon capture more feasible.

Dependent on the intensity of the sunlight during the day, plant operators can adjust the amount of hydrocarbon fluid 22 (natural gas) going into the solar reformer 16 by way of a control valve 30, or the like, from a full bypass mode to complete reforming mode, in order to control the flow of hydrocarbon fluid 22 to the combustor 28 of the combined cycle gas turbine power plant 14, thereby maximizing plant power output and efficiency, while satisfying power grid commitments. With the augmentation of the solar reformer 16, the CSCC plant can substantially minimize use of hydrocarbon fluid, and more particularly, natural gas consumption during daylight operations while still maintaining plant power output at its full capacity. This saving of natural gas consumption represents a significant reduction on the grid's fossil fuel consumption and $CO_2$ emissions.

It should be noted that the CSCC plant described herein may include standard power plant features such as feed water heaters, steam generator equipment, a steam generator, pumps, and the like. As described, the system 10 is operable using the reformate fuel or the hydrocarbon fluid, such as natural gas fuel.

Figure 2:
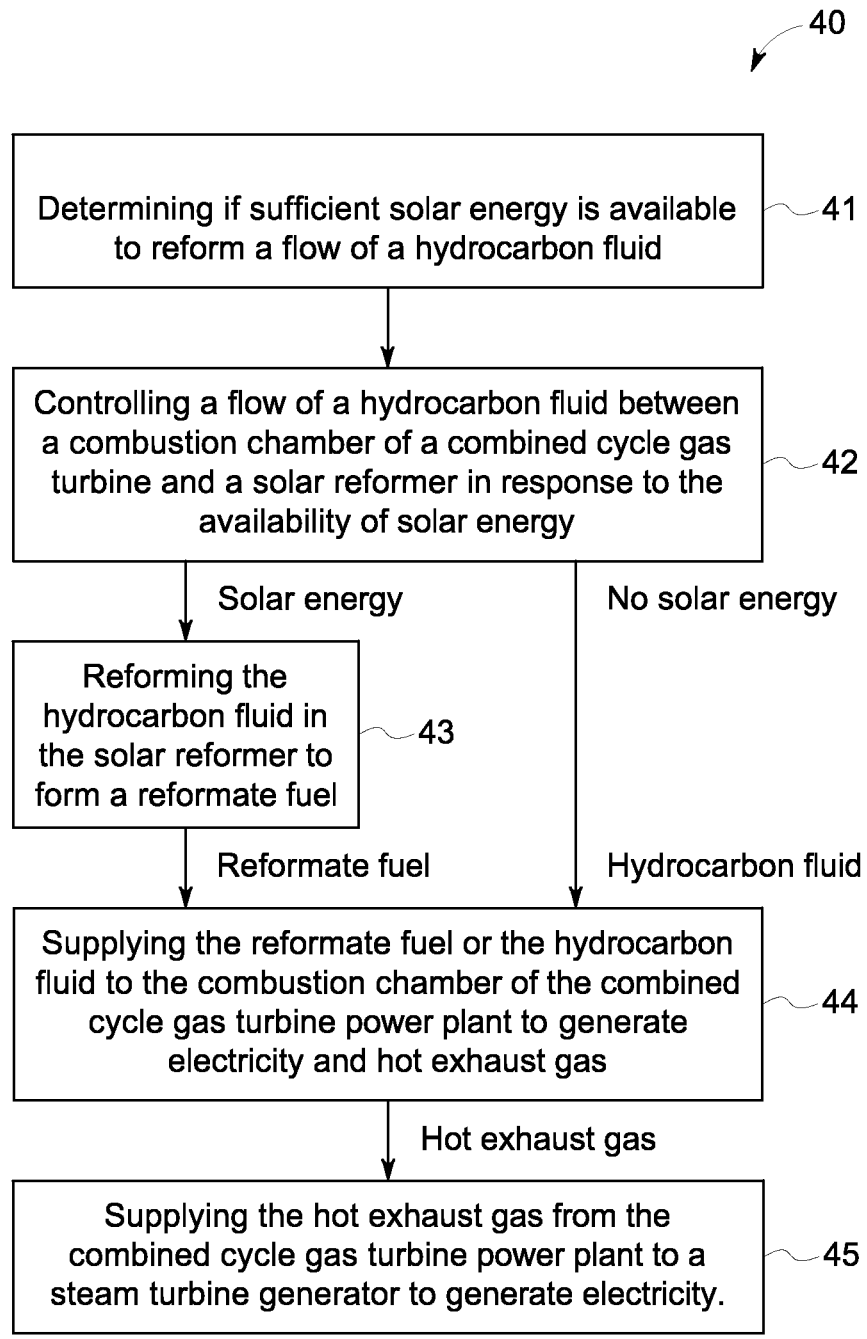
FIG. 2 is a flow diagram illustrating a method of operating a hybrid concentrated solar combined cycle power plant according to an embodiment.

FIG. 2 is a flow diagram illustrating a method 40 of operating the hybrid concentrated solar combined cycle power plant of FIG. 1. As previously described, in that the combined cycle gas turbine power plant is operable between an incoming hydrocarbon fluid and a reformate fuel 6, an initial determination 41 if sufficient solar energy is available to reform a flow of a hydrocarbon fluid into the solar reformer is made. Subsequent to the determination 41, the flow of hydrocarbon fluid is adjusted 42 between a combustion chamber of the combined cycle gas turbine power plant and the solar reformer. If sufficient solar energy is present, the flow is directed toward the solar reformer and reforming 43 of the hydrocarbon fluid takes place therein to form a reformate fuel. If insufficient solar energy is present, the flow is directed toward the combustion chamber of the combined cycle gas turbine power plant. The reformate fuel or the hydrocarbon fluid is next supplied 44 to the combustion chamber of the combined cycle gas turbine power plant to generate electricity and combustion exhaust gases. Finally, the combustion exhaust gases are supplied 45 to a steam generator to generate additional electricity.

Referring now to FIGS. 3 and 4, illustrated are alternate solar reformer designs for use in the hybrid concentrated solar combined cycle power plant of FIG. 1. The disclosed solar reformer designs offer enhanced energy and mass transfer, which translates to higher solar utilization efficiency and lower steam requirements. In areas where water resource is scarce or a high temperature reforming (i.e. 800° C.) is desired, the proposed solar reformer also features a partial oxidation design, where a small amount of air can be introduced into the reactor to prevent coke formation and to provide exothermic heat to boost reforming reaction kinetics. The combined use of solar energy and partial oxidation reaction creates a whole new category of a natural gas reforming process that is fundamentally different from established processes, such as catalytic partial oxidation (CPO), autothermal reforming (ATR) and steam methane reforming (SMR).

Referring more particularly to FIG. 3, illustrated in an isometric view is a solar reformer design for use in a hybrid concentrated solar combined cycle power plant, generally similar to hybrid concentrated solar combined cycle power plant 10 of FIG. 1. More particularly, illustrated in FIG. 3 is a direct-heating solar reformer 50 according to an embodiment. Direct-heating solar reformer 50 comprises a reforming catalyst block 52, enclosed in a reformer chamber 54 having a quartz window 56 formed as a part thereof. Included exterior the quartz window 56 is a cone shaped opening 58 having an optional reflective coating 60 formed thereon a surface 61 to direct solar radiation 62 toward an interior of the reformer chamber 54 via the quartz window 56. On a generally opposed portion of the reformer chamber 54 is a coaxial tube-in-tube pipe 64 having an interior flow through for an incoming reactant stream 63, similar to hydrocarbon fluid 22 of FIG. 1. In this particular embodiment, the incoming reactant stream 63 is comprised of natural gas and steam. The incoming reactant stream 63 flows downward into the reformer 50, and more particularly the reformer chamber 54, via an outer tube 68 of the coaxial tube-in-tube pipe 64. The reformer product 70, or hot reformate fuel 71, generally similar to reformate fuel 26 of FIG. 1, flows out of the reformer 50, and more particularly the reformer chamber 54, via an inner tube 72 of the coaxial tube-in-tube pipe 64. This directional flow of the reformer product 70 provides preheating of the incoming cold reactants, and more particularly the incoming reactant stream 63, countercurrently as it flows out of the reformer 50.

During operation of the reformer 50, the preheated incoming reactant stream 63 enters the reformer 50 and is dispersed in an upper portion 74 of the reactor chamber 54. The incoming reactant stream 63 next passes through the reforming catalyst block 52 and undergoes methane reforming reaction as it flows toward a lower portion 76 of the reactor chamber 54. Concentrated solar radiation 62 passes through the quartz window 56 and heats a bottom face 78 of the reforming catalyst block 52 to over 500°~800° C. At this point, reforming kinetics occurs very fast and methane conversion quickly reaches equilibrium. It is estimated that at 690° C., approximately 20-30% of the methane will convert to CO and $H_2$. The reformate fuel 71 then enters a plurality of return tubes 80, having a plurality of openings 82 positioned at the bottom face 78 of the reforming catalyst block 52. As the reformate fuel 71 flows upward in the plurality of return tubes 80, the hot gas contained therein is cooled by the incoming reactant stream 63 flowing downwards in the surrounding reforming catalyst block 52, thus achieving another level of heat recovery and improved efficiency.

Traditional solar thermal reformers can only reach about 550° C. temperature, which is 200° C.-300° C. lower than the ideal methane reforming temperature. The addition of oxygen into the solar reformer 50 will help boost reaction temperatures for a high conversion of methane. In a typical steam methane reforming (SMR) process, the process is carried out at temperatures in a range of approximately 700° C.-1000° C. and in the presence of metal-based (such as nickel) catalysts. The reformer is usually heated indirectly in a natural gas furnace. The efficiency of this type of SMR process is typically 65% to 75%.

Referring again to FIG. 1, in the preferred embodiment of the proposed hybrid CSCC system 10, the CSP temperature is approximately 500° C.~650° C., with the conversion of methane in the solar reformer 16 being around 20%~50%. This is an acceptable conversion. In contrast to hydrogen plants where the objective is to maximize hydrogen yield, the purpose of the solar reformer 16 is to pack solar energy into the reformate fuel 26. As previously stated, in the case where a higher natural gas conversion is required or water consumption is a major limitation, partial oxidation within the solar reformer 16 can be used (described presently).

A plurality of injection ports 84 may be optionally formed inside the reformer chamber 54 to provide an inlet for an oxygen containing gas. The presence of oxygen in the reformer 50, and more particularly within the reformer chamber 54, is known to have an inhibitory effect on coke formation, which leads to multiple benefits. One benefit of the injection of a small percentage of oxygen (<5%) into the solar reformer 50 is the prevention of coke deposition on the quartz window 56 that would otherwise block solar radiation 62. Oxygen is known to inhibit coke formation, and would negate or minimize the need for steam in the solar reformer 50. In a typical steam methane reformer (SMR) a steam to carbon ratio of over 2.5 is required. With the injection of oxygen into solar reformer 50, a steam to carbon ratio of less than 1 is required. The reduction in steam requirement in the solar reformer 50 leads to significant reduction on water consumption, making the process suitable for areas where water resources are scarce. In addition, the exothermic heat of the partial oxidation reaction will help boost the reforming reaction kinetics by elevating the reactor chamber 50 temperature.

Referring now to FIG. 4, illustrated in an isometric view is another solar reformer design for use in a hybrid concentrated solar combined cycle power plant, generally similar to hybrid concentrated solar combined cycle power plant 10 of FIG. 1. More particularly, illustrated in FIG. 4 is a nondirect-heating solar reformer 100 according to an embodiment. Indirect-heating solar reformer 100 comprises a reformer chamber 104 having a quartz window 106 formed as a part thereof. Included exterior the quartz window 106 is a cone shaped opening 108 having an optional reflective coating 110 formed thereon a surface 111 to direct solar radiation 112 toward an interior of the reformer chamber 104 via the quartz window 106. On a generally opposed portion of the reformer chamber 104 is a coaxial tube-in-tube pipe 114 having an interior flow through for an incoming reactant stream 116, such as hydrocarbon fluid 22 of FIG. 1. In this particular embodiment, the incoming reactants are natural gas and steam. The incoming reactant stream 116, or hydrocarbon fluid 22, flows downward into the reformer 50, and more particularly the reformer chamber 54, via an outer tube 118 of the coaxial tube-in-tube pipe 114. The reformer product 120, or hot reformate fuel 122 product, flows out of the reformer 100, and more particularly the reformer chamber 104, via an inner tube 124 of the coaxial tube-in-tube pipe 114. Similar to reformer 50 of FIG. 3, this directional flow of the reformer product 120 provides preheating of the incoming cold reactants, and more particularly the incoming reactant stream 116, countercurrently as it flows out of the reformer 100. As detailed above, an injection of a small amount of air via a plurality of air ports (not shown) may be included for enhanced reformer performance.

The overall design of the indirect heating solar reformer 100 is similar to the direct heating solar reformer illustrated in FIG. 3, except that the incoming reactant stream 116 in the indirect heating design would not contact the reformer quartz window 106. In contrast to the direct heating solar reformer 50 of FIG. 3, in the indirect heating solar reformer 100, the solar radiation 112 heat is first absorbed by a plurality of SMR reaction tubes 126 and transferred to the interior of the reaction tubes 126 via heat conduction to support the natural gas reforming reaction. A reforming catalyst 128 is disposed inside each of the plurality of reaction tubes 126. This design eliminates the quartz window 106 blockage issues. Due to the conductive heat transfer, the SMR reaction temperature inside of the reaction tubes 126 would be approximately 400° C.-500° C., substantially lower than in the previously described direct-heating method (600° C.-800° C.). Similar to the oxygen or air injection in the previous direct heating design of FIG. 3, a low level of oxygen injection in the indirect heating chamber 100 may be incorporated to boost reformer performance and to maintain an appropriate level of solar energy absorption via reforming reaction.

During operation of the reformer 100, the preheated incoming reactant stream 116 enters the reformer 100 via the plurality of reaction tubes 126. The incoming reactant stream 116 flows within each of the plurality of reaction tubes 126 passing through the reforming catalyst 128 and undergoes methane reforming reaction as it flows toward a lower portion 130 of the reformer chamber 104. Concentrated solar radiation 112 passes through the quartz window 156 and heats the plurality of reaction tubes 126 via heat conduction to support the reforming reaction. The reformate fuel mixture 122 flows upward in the plurality of reaction tubes 126 and the hot gas contained therein is cooled by the incoming reactant stream 116 flowing downward in the surrounding reaction tubes 126, thus achieving another level of heat recovery and improved efficiency.

It should be noted that the direct heating reformer process and indirect heating reformer process differ from the traditional catalytic partial oxidation process, which relies on a large amount of oxygen (O/C>1) and leads to markedly reduced energy efficiency. Considering limited water supply in typical solar rich areas, SMR catalysts that tolerate low steam/carbon (S/C~0.5) operations will be selected for catalyst 52 and 128.

The solar reformer design described herein, additionally features a novel catalyst regeneration process that also serves as a preheating procedure during the startup of reformer 50, 100. In some areas of the solar reformer 50, 100 that cannot be reached by oxygen doping, coke may form on a surface of the reforming catalyst 52, 128. Air injection prior to starting the reformer 50, 100 may be used to burn off the coke and the energy released during coke burn off may be utilized for initial heating of the reformer 50, 100. Air injection may be achieved by injecting air in a reverse direction prior to introducing the reactant fuel stream 63, 116 into the reformer 50, 100. Such preheating may lower the preheating requirements for the reactant fuel stream 63, 116 for lightoff. Once the catalytic partial oxidation (CPO) reaction is initiated, it will provide the necessary heat required for preheating the reactant fuel stream 63, 116 through radiation. Such technique will reduce the start-up time required for the reformer 50, 100 significantly and is desirable due to the limited availability of the sun. In another embodiment a small electric heater (not shown) may be inserted at an inlet of the catalyst 52, 128 to increase the temperature of the reactant fuel stream 63, 116 prior to light-off.

Referring now to FIG. 5, illustrated in a graphical view is the solar powered portion 150 and hydrocarbon fluid powered portion 152 of a total load relative to the time of day 154 on a power generation system, such as system 10, during a typical day. As sunlight hours increase, as noted by the time of day 154, the solar power portion 150 increases as a percentage of the overall power load and the hydrocarbon fluid powered portion 152 decreases as a percentage of the overall power load. Accordingly, during plentiful solar conditions, solar reforming can be utilized to decrease the overall hydrocarbon fluid consumption, providing a more efficient system.

Referring now to FIG. 6, illustrated in a graphical view is an estimate of the efficiency of the hybrid solar-combined cycle 10 of FIG. 1, as it relates to overall power efficiency. More specifically, illustrated is solar power efficiency 160 as it relates to overall system efficiency 162. As indicated, as percentage of hydrocarbon fuel to the solar reformer, and use of the solar reformer is increased, the solar power efficiency 160 increased. Likewise, as the use of the solar reformer continues to increase, the solar power efficiency 160 is maintained, while overall system efficiency 162 increases.

System modeling calculations substantiate a claim of high solar to power efficiency, with as much as 30~36% solar to electricity efficiency achieved. As a result of the augmentation of solar energy, the combined cycle system achieves an overall fossil fuel HHV efficiency gain of up to 4% (from 50% to 54%).

By packing solar energy into a hydrocarbon fuel via solar reforming reactions and channeling it through a combined cycle gas turbine (CCGT) of the combined cycle gas turbine power plant, yields in solar-to-electricity efficiencies of over 30% are achievable. The hybridization of concentrated solar and CCGT is an efficient way of introducing large amount of solar energy into a power generating system without jeopardizing grid stability. It is expected that this technology will catalyze the rapid adoption of higher renewable portfolio standards and cut power plant fossil fuel consumptions and $CO_2$ emissions.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electric power generation system comprising:
   a concentrated solar plant (CSP) comprising a solar field and a steam generator;
   a solar reformer configured to receive solar energy from the solar field and a hydrocarbon fluid as an incoming reactant stream, wherein the solar reformer converts the solar energy and the incoming reactant stream to thermal energy and chemical energy via a reforming action to form a reformate fuel;
   a combined cycle gas turbine (CCGT) power plant for generating electricity, the combined cycle gas turbine power plant configured to receive a hydrocarbon fluid and the reformate fuel from the solar reformer and emit combustion exhaust gas,
   wherein the combined cycle gas turbine power plant is configured operable based on at least one of the hydrocarbon fluid and the reformate fuel in response to the availability of solar energy to the solar reformer; and
   wherein the steam generator is configured to receive the hot exhaust gas emitted from the combined cycle gas turbine power plant to generate electricity.

2. The system of claim 1, wherein the solar reformer comprises:
   a cone shaped opening configured to concentrate the received solar energy through a quartz window and into a reforming chamber;
   a reforming catalyst disposed therein the reforming chamber; and
   a coaxial tube-in-tube pipe in fluidic communication with the reaction chamber and configured to provide an inlet for the incoming reactant stream and an outlet for the reformate fuel.

3. The system of claim 2, wherein the solar reformer is a direct-heating solar reformer.

4. The system of claim 2, wherein the solar reformer is an indirect heating solar reformer.

5. The system of claim 1, wherein the combined cycle gas turbine power plant comprises a combustion chamber and a plurality of gas turbines, the combustion chamber configured to receive the hydrocarbon fluid during a lack of presence of solar energy and the reformate fuel during the presence of solar energy for combustion therein to produce the combustion exhaust gas.

6. The system of claim 1, further including a control valve to control the amount of hydrocarbon fluid directed into the solar reformer as the incoming reactant stream from a full bypass mode to complete reforming mode.

7. The system of claim 1, wherein the hydrocarbon fluid comprises at least one of natural gas, methane, biogas, and liquid hydrocarbons.

8. The system of claim 1, wherein the hydrocarbon fluid is natural gas.

9. A method of generating electric power comprising;
   controlling a flow of a hydrocarbon fluid between a combustion chamber of a combined cycle gas turbine power plant and a solar reformer, the solar reformer configured to receive solar energy from a solar field and the hydrocarbon fluid,
   reforming the hydrocarbon fluid in the solar reformer by converting the solar energy and the hydrocarbon fluid to thermal energy and chemical energy via a reforming action to form a reformate fuel;
   supplying the reformate fuel to the combined cycle gas turbine power plant for generating electricity, the combined cycle gas turbine power plant configured to receive one of the hydrocarbon fluid and the reformate fuel from the solar reformer and emit hot exhaust gas;
   supplying the hot exhaust gas to a steam generator configured to receive the hot exhaust gas emitted from the combined cycle gas turbine power plant and generate electricity,
   wherein the combined cycle gas turbine power plant is configured operable based on at least one of the hydrocarbon fluid and the reformate fuel, in response to the availability of solar energy to the solar reformer.

10. The method of claim 9, wherein the step of controlling a flow of a hydrocarbon fluid between the combustion chamber of the combined cycle gas turbine power plant and the solar reformer includes operating a control valve to adjust the amount of hydrocarbon fluid directed into the solar reformer from a full bypass mode to complete reforming mode.

11. The method of claim 9, wherein the step of reforming the hydrocarbon fluid in the solar reformer includes direct heating of the hydrocarbon fuel by the solar energy within a reformer chamber to form the reformate fuel.

12. The method of claim 9, wherein the step of reforming the hydrocarbon fluid in the solar reformer includes indirect heating of the hydrocarbon fuel by the solar energy within a reformer chamber to form the reformate fuel.

13. A solar reformer configured to receive solar energy from the solar field and a hydrocarbon fluid as an incoming reactant stream, wherein the solar reformer converts the solar energy and the incoming reactant stream to thermal energy and chemical energy via a reforming action to form a reformate fuel, the solar reformer comprising:

a cone shaped opening configured to concentrate the solar energy received through a quartz window and into a reforming chamber;

a reforming catalyst disposed therein the reforming chamber; and a coaxial tube-in-tube pipe in fluidic communication with the reaction chamber and configured to provide an inlet for the incoming reactant stream and an outlet for the reformate fuel, wherein the solar reformer is operational to power a combined cycle gas turbine power plant in the presence of solar energy.

14. The solar reformer of claim 13, wherein the solar reformer is a direct-heating reformer.

15. The solar reformer of claim 14, wherein the reforming catalyst is disposed within the reformer chamber and configured to provide direct heating of the incoming reactant stream and the reforming catalyst, the solar energy directed through the quartz window providing direct heating to the incoming reactant stream.

16. The solar reformer of claim 13, wherein the solar reformer is an indirect heating reformer.

17. The solar reformer of claim 16, wherein the reforming catalyst is disposed within a plurality of reaction tubes located within the reformer chamber, the incoming reactant stream flowing therethrough the plurality of reaction tubes, the solar energy directed through the quartz window providing indirect heating to the incoming reactant stream via heat conduction through the plurality of reaction tubes.

18. The solar reformer of claim 13, wherein the solar reformer is configured to reform a hydrocarbon fluid to produce a reformate fuel comprising hydrogen, carbon monoxide and carbon dioxide.

19. The solar reformer of claim 13, wherein the solar reformer is used to drive a methane-reforming reaction within the solar reformer as $CH_4+H_2O+(Solar\ Heat) \rightarrow CO+3H_2$.

20. The solar reformer of claim 13, wherein the solar reformer is used to drive a methane-reforming reaction within the solar reformer as $4CH_4+O_2+2H_2O \rightarrow 10H_2+4CO$.

* * * * *